(12) United States Patent
Chamberlain et al.

(10) Patent No.: US 7,721,258 B2
(45) Date of Patent: May 18, 2010

(54) INTEGRATED DEVELOPMENT ENVIRONMENT WITH MANAGED PLATFORM REGISTRY

(75) Inventors: Brian Chamberlain, Carnation, WA (US); Jason P. Smith, Seattle, WA (US); Xin Yan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1195 days.

(21) Appl. No.: 11/266,417

(22) Filed: Nov. 3, 2005

(65) Prior Publication Data

US 2007/0169100 A1 Jul. 19, 2007

(51) Int. Cl.
*G06F 9/44* (2006.01)
(52) U.S. Cl. .................. 717/120; 717/121; 717/122
(58) Field of Classification Search .............. 717/101, 717/106–113, 120, 146–148, 121; 709/310; 707/103 R, 104.1; 719/328
See application file for complete search history.

(56) References Cited

U.S. PATENT DOCUMENTS

| | | | | |
|---|---|---|---|---|
| 5,822,580 A | * | 10/1998 | Leung | 707/103 R |
| 6,170,081 B1 | * | 1/2001 | Fontana et al. | 717/104 |
| 6,405,364 B1 | * | 6/2002 | Bowman-Amuah | 717/101 |
| 2003/0018825 A1 | * | 1/2003 | Johnson et al. | 709/310 |
| 2004/0045015 A1 | * | 3/2004 | Haji-Aghajani et al. | 719/328 |
| 2004/0122861 A1 | * | 6/2004 | Hulse et al. | 707/104.1 |

* cited by examiner

*Primary Examiner*—Lewis A Bullock, Jr.
*Assistant Examiner*—Carina Yun
(74) *Attorney, Agent, or Firm*—Woodcock Washburn LLP

(57) ABSTRACT

A software development tool, in the form of an integrated development environment (IDE), comprises a managed platform registry for managing the combination of compatible target platforms and versions of a software development framework. Each compatible combination of a platform and a version of the software development framework is assigned a unique managed platform ID. The managed platform IDs and information associated therewith are managed by the managed platform registry. The software development tool provides upgrade capability allowing a developer to use a newer version of the software development framework while maintaining the current target platform. The software development tool also provides the ability to switch target platforms while maintaining the current version of the software development framework.

14 Claims, 4 Drawing Sheets

12

| | Software Development Tool/Framework Version 1 | Software Development Tool/Framework Version 2 | • • • | Software Development Tool/Framework Version N |
|---|---|---|---|---|
| Platform 1 | Supported (ID-1) | | | Supported (ID-2) |
| • • • | | | | |
| Platform K | Supported (ID-3) | Supported (ID-4) | | Supported (ID-5) |

14 → (points to header row)

| | Software Development Tool/Framework Version 1 | Software Development Tool/Framework Version 2 | ... | Software Development Tool/Framework Version N |
|---|---|---|---|---|
| Platform 1 | Supported (ID-1) | | | Supported (ID-2) |
| ... | | | | |
| Platform K | Supported (ID-3) | Supported (ID-4) | | Supported (ID-5) |

12

14 →

← 16

INTEGRATED DEVELOPMENT ENVIRONMENT WITH MANAGED PLATFORM REGISTRY

TECHNICAL FIELD

The technical field generally relates to integrated development environments (IDEs) and more specifically relates to managing target platforms and versions of software development tools in an IDE.

BACKGROUND

Many software developers use software development tools to develop software for specific devices (also referred to as target platforms). Software development tools are often integrated into integrated development environments (IDEs). An example IDE is VISUAL STUDIO®.NET 2005 developed by MICROSOFT® Corporation. Software is often developed utilizing a software development framework. Example software development frameworks include MICROSOFT.NET FRAMEWORK and MICROSOFT.NET COMPACT FRAMEWORK, also developed by MICROSOFT® Corporation. As a specific example, the MICROSOFT.NET COMPACT FRAMEWORK is an example of a software development framework utilized to develop software for mobile devices. Example mobile devices include POCKET PC 2003, SMARTPHONE 2003, and devices supporting the WINDOWS CE® 5.0 operating system.

Typically, a combination of a development tool and framework is selected based on productivity features of the toolset and the features and functionality intrinsic to the framework. Because there often is a one-to-one correlation between a given development tool and a version of the development framework that it supports, the combination typically is manifested in a specific development tool. In such an environment, developing software for different versions of the framework would require different toolsets and force a software developer to forego potential advancements in newer development tools. Also, developing similar software for a different target platform would require the developer to transfer source code to a different project or make significant changes to the existing project. The above described processes of recreating software source code projects can be burdensome, time consuming, expensive, and error-prone.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter. A software development tool utilizes a managed platform registry to provide the capability to concurrently develop software for multiple target platforms. The software development tool utilizing the managed platform registry also provides the capability to develop software against multiple versions of a software development framework. The software development tool also provides the capability to switch to other versions of a target platform while maintaining software already developed for the current target platform and software development framework. The software development tool also provides the capability to port developed software to other versions of the software development framework. A unique identifier (managed platform ID) is assigned to each compatible combination of a version of the target platform and software development framework. The managed platform IDs are managed by the managed platform registry.

BRIEF DESCRIPTION OF THE DRAWINGS

The foregoing and other objects, aspects and advantages will be better understood from the following detailed description with reference to the drawings, in which:

FIG. 1 is an illustration of an exemplary managed platform registry;

DETAILED DESCRIPTION OF ILLUSTRATIVE EMBODIMENTS

Figure 2:
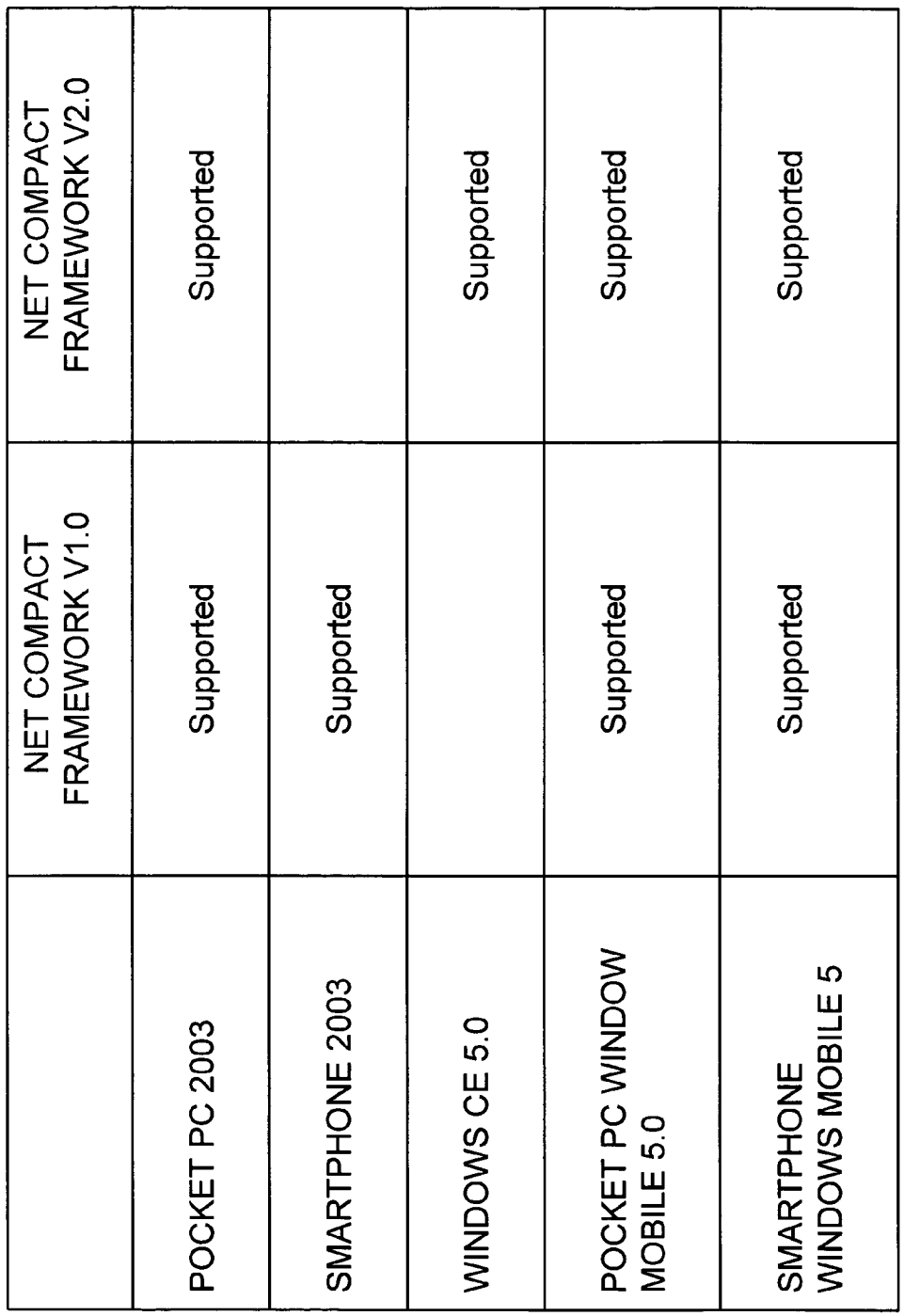
FIG. 2 is an illustration of a registry depicting specific exemplary platforms and specific versions of a software development tool.

A software development tool for mobile target platforms provides the capability to concurrently develop software for multiple target platforms as well as upgrade to a newer version of the software development framework. The software development tool also provides the capability to port developed software between target platforms and to upgrade developed software to newer versions of the software development framework. The software development tool is part of an integrated development environment (IDE). In an exemplary embodiment, the integrated development environment (IDE) comprises a managed platform registration for managing the combination of a target platform and a version of the software development framework. Managed platforms are registered in a data repository indicating the compatibility between various platforms and versions of the software development framework. The software development tool also provides an upgrade capability allowing a developer to use a newer version of the software development framework while maintaining the current target platform.

FIG. 1 is an illustration of an exemplary managed platform registry 12 comprising various exemplary platforms and versions of a software development framework. The managed platform registry 12 comprises various target platforms, as depicted in the column 16, and various version of the software development framework, as depicted in the row 14. The managed platform registry 12 specifies the compatibility between specific target platforms and versions of the software development framework and is indicated by the designation at respective intersections of the corresponding rows and columns. A platform is compatible with a version of the software development framework if that framework can be used to develop software for that platform. As depicted in registry 12, each platform is compatible with at least one version of the software development framework. For example, platform 1 is compatible with version 1 and version 2 of the software development framework, as indicated by the word "supported" located at the respective intersections of the rows and columns. Also, platform K is compatible with version 1, version 2, and version N of the software development framework. It is to be understood that the depiction of registry 12 is exemplary. The registry can be configured in any appropriate manner.

Rather than managing a platform alone or a version of a software development framework alone, the managed platform registry manages the combinations of platforms and compatible software development framework versions. For example, the combination of platform 1 and version 1 of the software development framework is assigned ID-1 (as the managed platform ID), as shown in FIG. 1. It is this combination, assigned a unique identifier ID-1, that is managed by the managed platform registry 12. Information pertaining to the combination of the version of the software development framework and the target platform is also stored and obtainable via the registry. As described below, this information is utilized to switch between target platforms and upgrade to newer versions of the software development framework. Other unique managed platform IDs shown in FIG. 1 include ID-2 assigned to the combination platform 1 and version N of the software development framework, ID-3 assigned to the combination platform K and version 1 of the software development framework, ID-4 assigned to the combination platform K and version 2 of the software development framework, and ID-5 assigned to the combination platform K and version N of the software development framework.

When the software development tool (IDE, such as Microsoft Visual Studio 2005) is launched, the developer chooses the target platform and the target software development framework for which software is to be developed. The registry is queried to determine if the version of the software development framework selected is compatible with the requested target platform. That is, the managed platform registry is queried to determine if a managed platform ID exists for the combination of the selected versions of the software development framework and the target platform. If the target platform and software development framework versions are not compatible (no managed platform ID), the developer is notified accordingly. If the versions of the requested target platform and the software development framework are compatible (managed platform ID exists in registry), information needed to begin software development for the target platform utilizing the version of the software development framework is obtained via the registry and used to commence the software development process.

FIG. 2 is an illustration of a registry depicting specific exemplary platforms and specific versions of a software development framework. The registry shown in FIG. 2 depicts the following exemplary platforms in column 20: POCKET PC 2003, SMARTPHONE 2003, WINDOWS CE 5.0, POCKET PC WINDOWS MOBILE 5.0, and SMARTPHONE WINDOWS MOBILE 5. In row 22, the following versions of .NET COMPACT FRAMEWORK are shown: .NET COMPACT FRAMEWORK VERSION 1.0 and .NET COMPACT FRAMEWORK VERSION 2.0. The .NET COMPACT FRAMEWORK software development framework is used to develop software for mobile devices, such as those depicted in FIG. 2. It is emphasized that the software development framework, and the platform devices depicted in FIG. 2 are exemplary. As shown in FIG. 2, .NET COMPACT FRAMEWORK VERSION 1.0 is compatible with POCKET PC 2003, SMARTPHONE 2003, POCKET PC WINDOWS MOBILE 5.0, and SMARTPHONE WINDOWS MOBILE 5.0. Also as depicted in FIG. 2, .NET COMPACT FRAMEWORK VERSION 2.0 is compatible with POCKET PC 2003, WINDOWS CE 5.0, POCKET PC WINDOWS MOBILE 5.0, and SMARTPHONE WINDOWS MOBILE 5.0.

In an exemplary embodiment, the managed platform registry is utilized to facilitate upgrading to a version of the software development framework while preserving source code and software development environment settings already developed for the target platform. The managed platform registry is utilized to obtain information needed to accomplish upgrading from a current version of the software development framework to another version of the software development framework. For example, a software developer can upgrade a development project to target a later version of the software development framework and continue developing software for the target platform, without having to recreate source code already developed for the target platform or the software development environment settings that facilitated its production in the IDE. When the software developer attempts to upgrade to another version of the software development framework, the managed platform registry is queried to determine if the newer version of the software development framework is compatible with the current target platform. If there is no compatibility, the upgrade path will be blocked. If there is compatibility, the software that has already been developed for the target platform using the current version of the software development framework is ported to the newer version. Information is obtained from the managed platform registry as necessary to port the developed source code. In an exemplary embodiment, the software development framework targeted by a given software development project can be upgraded to a newer version of the software development framework. For example, if desired, the software developer can port software developed for a target platform using an first (e.g. earlier) earlier version of a software development framework to a second (e.g., later) version of the software development framework.

Figure 3:
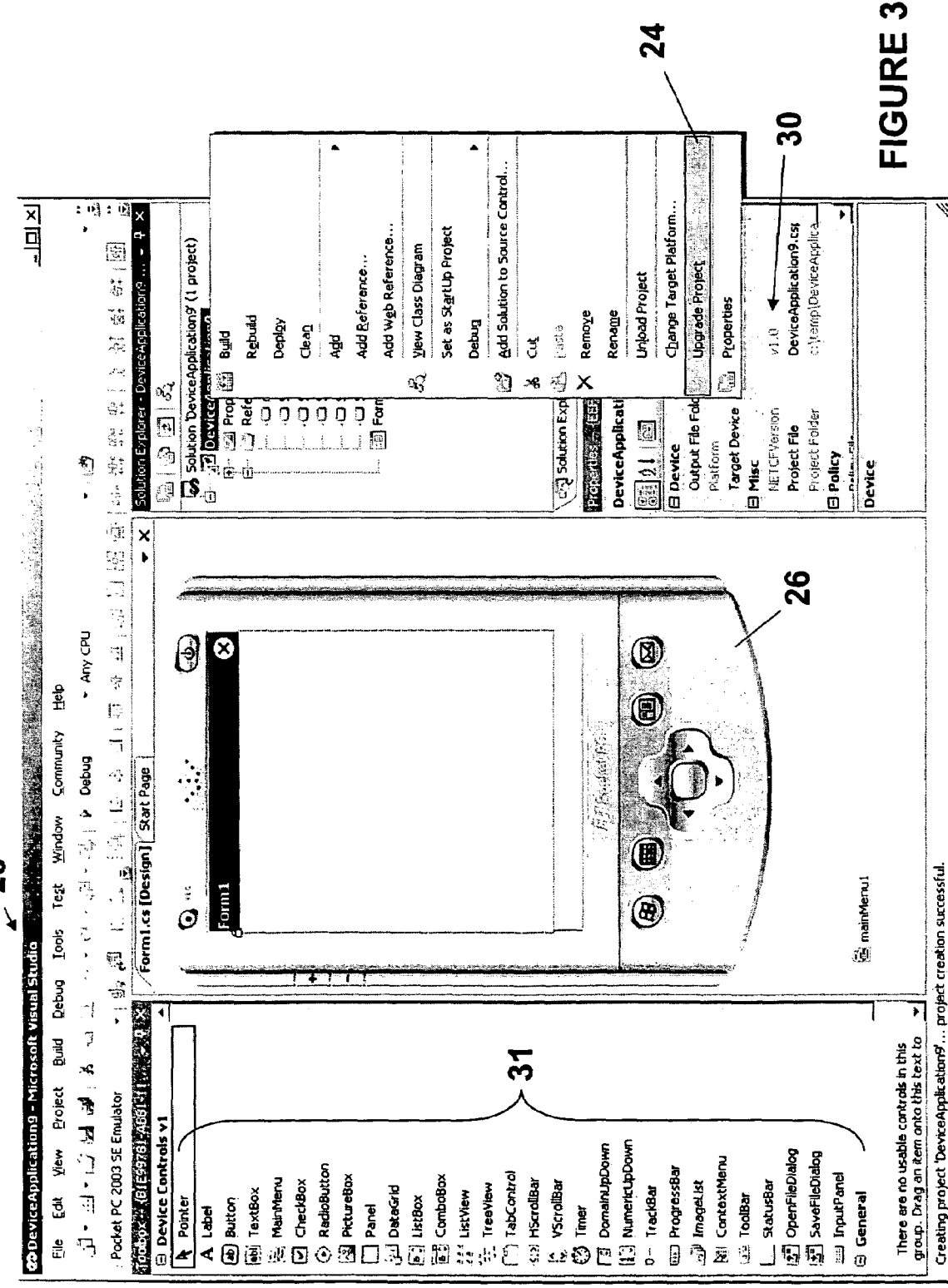
FIG. 3 is an illustration depicting upgrading the version of an exemplary software development for an exemplary target platform.

FIG. 3 is an illustration depicting upgrading the version of an exemplary software development framework for an exemplary target platform. The target platform depicted in FIG. 3 is the POCKET PC 2003, labeled as item 26. The exemplary software development tool being used is MICROSOFT VISUAL STUDIOS 2005 as depicted in the toolbar labeled 28. The target software development framework is .Net Compact Framework 1.0. As depicted in FIG. 3, the software developer, developing software for the POCKET PC 2003 using Microsoft .Net Compact Framework 1.0, wants to upgrade the version of .Net Compact Framework currently be used to a newer version, version 2.0. To accomplish the upgrade, the software developer invokes the "Upgrade Project" command 24 from the drop down menu. In an exemplary embodiment, invoking the "Upgrade Project" command 24 can result in upgrading the version of the software development framework (.Net Compact Framework) to next newer version, which is .net Compact Framework version 2.0. In this exemplary scenario however, it is assumed that the software developer is using MICROSOFT .Net compact framework version 1.0 (as indicated by the NetCF version property 30) and will upgrade to MICROSOFT .Net Compact Framework Version 2.0.

Upon invoking the "Upgrade Project" command 24, the managed platform registry is queried to determine if the current target platform 26 (POCKET PC 2003) is compatible with MICROSOFT .Net Compact Framework VERSION 2.0. In this exemplary scenario there is compatibility. The information needed to port the software developed for the target platform (POCKET PC 2003) and perform any required conversions is obtained from the managed platform registry from information associated with the managed platform ID assigned to the combination of POCKET PC 2003 and MICROSOFT .Net Compact Framework VERSION 2.0. Various portions of the display will change indicating that the software developer is now using the upgraded version of the software development framework, MICROSOFT .Net Compact Framework VERSION 2.0. For example, the "NetCF Version" property 30 will change to indicate version 2 (v2)

and the list of controls in the tool box column 31 will change accordingly. In an exemplary embodiment, after upgrading to a later version of the software development framework, controls supported only by the new version of framework will appear in the list 31.

Figure 4:
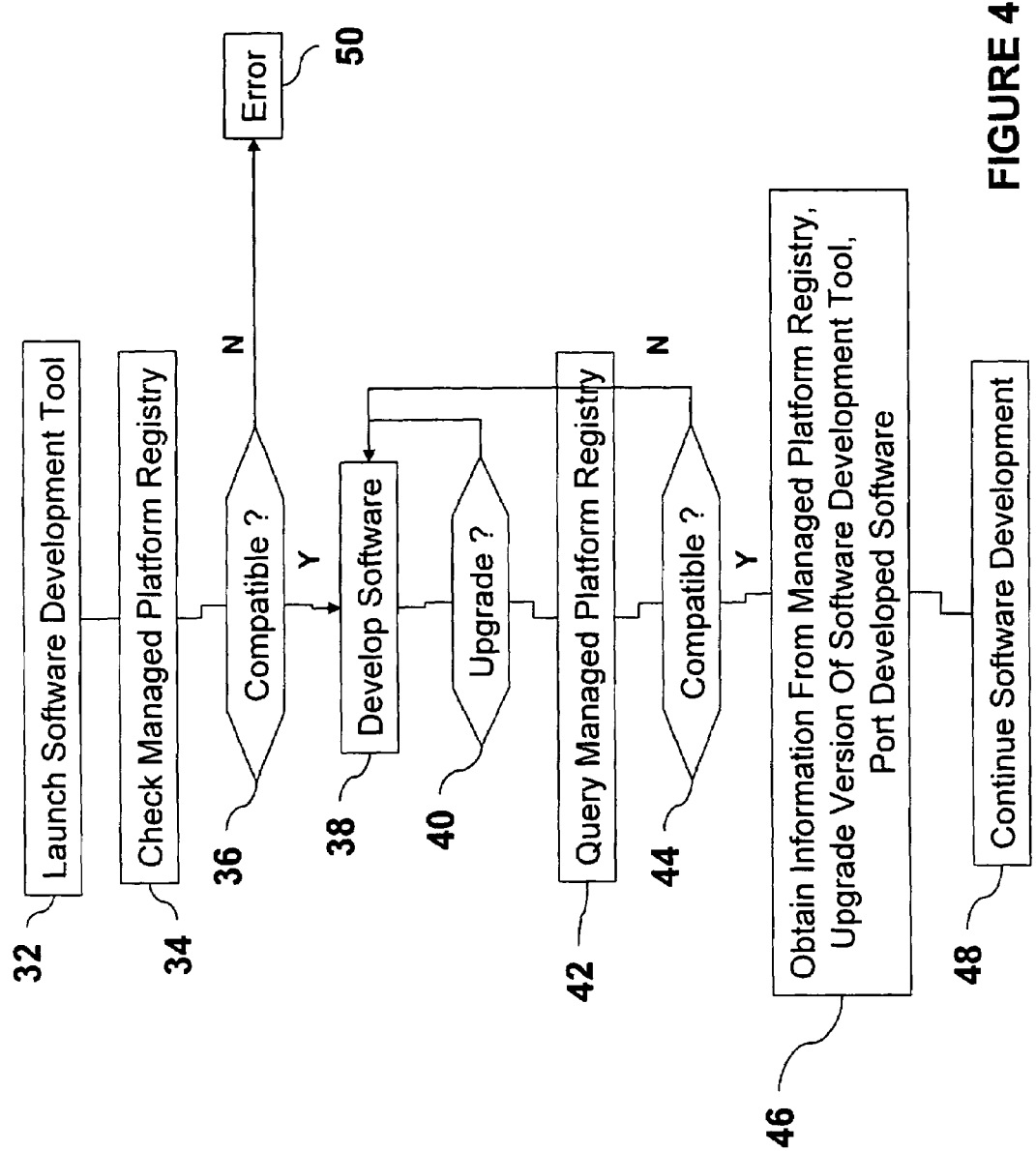
FIG. 4 is a flow diagram of an exemplary process for developing software utilizing a managed platform registry.

FIG. 4 is a flow diagram of an exemplary process for developing software utilizing a managed platform registry. The software development tool is launched at step 32. In an exemplary embodiment the software development tool is launched as part of an IDE. The managed platform registry is queried at step 34 to determine if the version of the software development framework and the target platform are compatible. If the version of the software development framework and the target platform are determined (step 36) not to be compatible, the software developer is accordingly notified at step 50. If the version of the software development framework and the target platform are determined (step 36) to be compatible, the software developer commences software development for the target platform at step 38.

At any time the software developer can decide to upgrade to another (e.g., later) version of the software development framework while maintaining source code already developed for the target platform. An upgrade to another version of the software development framework is requested at step 40. The managed platform registry is queried at step 42 to determine if the requested version of the software development framework and the target platform are compatible. If the requested version of the software development framework and the target platform are determined (step 44) not to be compatible, the upgrade request is denied. The software developer can continue software development for the target platform using the current version of the software development framework at step 38. If the requested version of the software development framework and the target platform are determined (step 44) to be compatible, information need to perform the upgrade is obtained from the managed platform registry at step 46. Also, information needed to port the current source code, developed for the target platform using the previous version of the software development framework, to the requested version of the software development framework is obtained from the managed platform registry at step 46. Also at step 46, the version of the software development framework is upgraded and the software development project for the target platform is ported to the upgraded version of the software development framework. Software development is continued at step 48, utilizing the upgraded version of the software development framework and the ported software.

In an exemplary embodiment, the target platform can be switched while maintaining the same version of the software development framework. The managed platform registry is queried to determine if the current version of the software development framework and the requested target platform are compatible. If there is compatibility, information is obtained from the managed platform registry to switch target platforms and to convert controls as necessary. In an exemplary embodiment, if after switching to a different target platform, a control is no longer supported in the new target platform, the control is marked as unsupported.

The various techniques described herein may be implemented in connection with hardware or software or, where appropriate, with a combination of both. Thus, the methods and apparatuses for developing software utilizing a managed platform registry or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for developing software utilizing a managed platform registry. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed in conjunction with developing software utilizing a managed platform registry. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

While methods and apparatuses for developing software utilizing a managed platform registry have been described in connection with the illustrative embodiments of the various figures, it is to be understood that other similar embodiments can be used or modifications and additions can be made to the described embodiments for performing the same function for developing software utilizing a managed platform registry without deviating therefrom. Rather, the specific features and acts described above are disclosed as example forms of implementing the claims. Therefore, methods and apparatuses for developing software utilizing a managed platform registry should not be limited to any single embodiment, but rather should be construed in breadth and scope in accordance with the appended claims.

What is claimed:

1. An integrated development environment implemented by at least one machine comprising:
a managed platform registry to manage combinations of:
a plurality of target platforms; and
a plurality of versions of a software development framework, wherein:
each target platform is compatible with at least one version of a software development framework; and
a first target platform for developing software, wherein:
the software is concurrently developable for any number of compatible combinations of said target platforms and said versions of said software development framework; and on the first target platform of at least one machine executing a first software development framework and using said framework to develop software code and upon a selection of execution of a second version of the software development framework, the integrated development environment performs the operations of:
  checking said managed platform registry to determine if a new version is compatible with the target platform; and
  if the new version is compatible with the target platform, executing the new version of the software development framework on the target platform and porting the software code developed with the first software development framework to a compatible second version of the software development framework.

2. An integrated development environment in accordance with claim 1, wherein software developed for a selected target platform utilizing a compatible version of said software development framework is portable to another version of said software development framework for said selected target platform.

3. An integrated development environment in accordance with claim 1, wherein said target platforms comprise at least one of a handheld computer, a personal digital assistant, a smart phone, a pocket personal computer, and an operating system for mobile devices.

4. An integrated development environment in accordance with claim 1, wherein said integrated development environment is updateable to include at least one of additional target platforms and additional versions of said software development framework.

5. A computer-readable storage medium having stored thereon a data structure in a managed platform registry for managing combinations of target platforms and versions of a software development framework, and instructions for accessing the data structure, the data structure comprising:
  a first data field comprising data representing a plurality of target platforms;
  a second data field comprising data representing a plurality of versions of a software development framework, each version of said software development framework capable of developing software for at least one of said plurality of target platforms, wherein software is concurrently developable for any number of compatible combinations of said target platforms and said versions of said software development framework; and
  a third data field comprising data representing said compatible combinations wherein:
    the instructions allow for the concurrent development of any number of compatible combinations of said target platforms and said versions of said software development framework;
    on a first target platform of at least one machine executing a first software development framework and using said framework to develop software code and upon a selection of execution of a second version of the software development framework, an integrated development environment performs the operations of:
      checking said managed platform registry to determine if a new version is compatible with the target platform; and
      if the new version is compatible with the target platform, executing the new version of the software development framework on the target platform and porting the software code developed with the first software development framework to a compatible second version of the software development framework.

6. A computer-readable storage medium having stored thereon a data structure in accordance with claim 5, wherein software developed for a selected target platform utilizing a compatible version of said software development framework is portable to another version of said software development framework for said selected target platform.

7. A computer-readable storage medium having stored thereon a data structure in accordance with claim 5, wherein said target platforms comprise at least one of a handheld computer, a personal digital assistant, a smart phone, a pocket personal computer, and an operating system for mobile devices.

8. A computer-readable storage medium having stored thereon a data structure in accordance with claim 5, wherein said data structure is expandable to include at least one of additional target platforms and additional versions of said software development framework.

9. A method for developing software implemented by at least one machine, said method comprising:
  selecting at least one target platform from a plurality of target platforms; and
  for each selected target platform, selecting a compatible version of a software development framework from a plurality of versions of said software development framework;
  developing software using the selected software framework, wherein:
    software is concurrently developable for said selected target platforms utilizing respective selected compatible versions of said software development framework;
    on a first target platform of at least one machine executing a first software development framework and using said framework to develop software code and upon a selection of execution of a second version of the software development framework, an integrated development environment performs the operations of:
      checking a managed platform registry to determine if a new version is compatible with the target platform; and
      if the new version is compatible with the target platform, executing the new version of the software development framework on the target platform and porting the software code developed with the first software development framework to a compatible second version of the software development framework.

10. A method in accordance with claim 9, wherein software developed for a selected target platform utilizing a compatible version of said software development framework is portable to another version of said software development framework for said selected target platform.

11. A method in accordance with claim 9, wherein said target platforms comprise at least one of a handheld computer, a personal digital assistant, a smart phone, a pocket personal computer, and an operating system for mobile devices.

12. A method in accordance with claim 9, wherein said integrated development environment is updateable to include at least one of additional target platforms and additional versions of said software development framework.

13. A method in accordance with claim 9, wherein:
  said plurality of target platforms is updateable to comprise additional target platforms; and said plurality of version of said software framework is updateable to comprise additional versions of said software development framework.

14. A method in accordance with claim 9, wherein said target platforms and said versions of said software development framework are selected from a registry comprising:

a first data field comprising data representing said plurality of target platforms;

a second data field comprising data representing said plurality of versions of a software development framework; and a third data field comprising data representing compatible combinations of said selected target platforms and said selected versions of said software development framework.

* * * * *